F. C. FULGHUM.
Evaporating Pan.
No. 44,177. Patented Sept. 13, 1864.
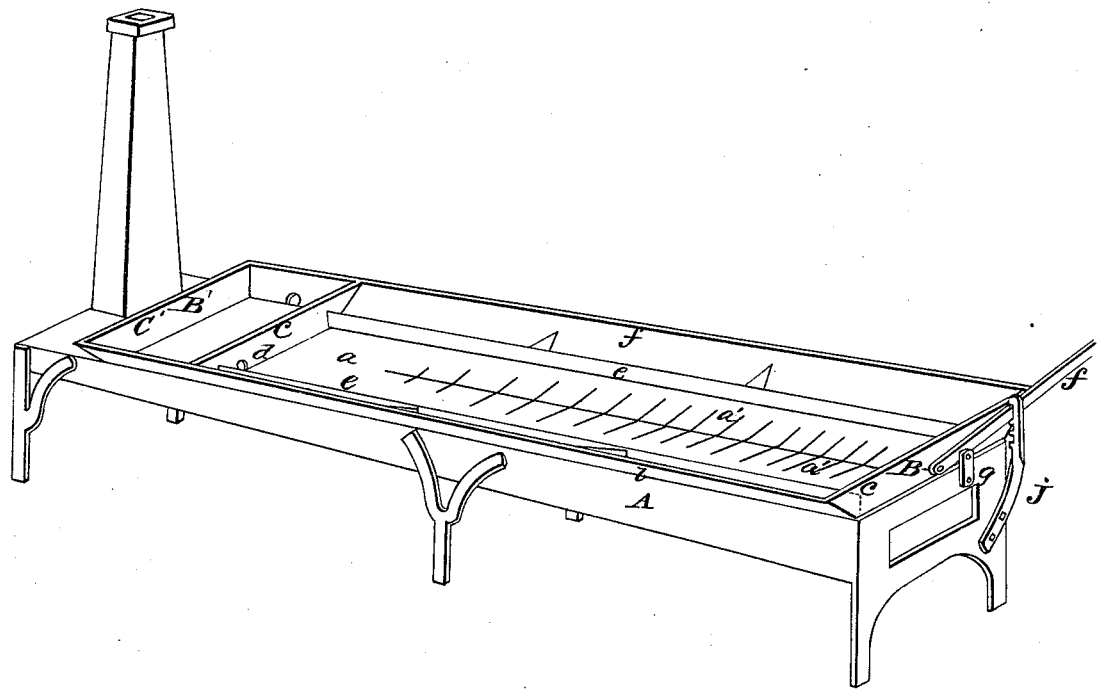
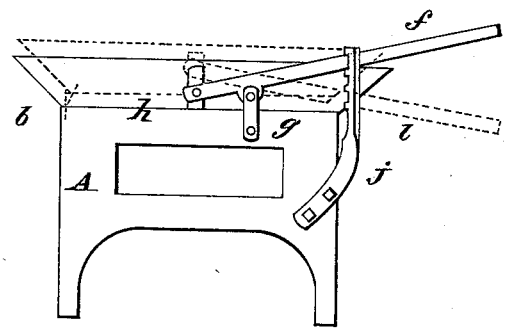
Witnesses:
D. L. Reid
E. M. Mays
Inventor:
F. C. Fulghum
Wm Clough atty

UNITED STATES PATENT OFFICE.

F. C. FULGHUM, OF ARBA, INDIANA.

IMPROVED CANE-JUICE EVAPORATOR.

Specification forming part of Letters Patent No. 44,177, dated September 13, 1864.

*To all whom it may concern:*

Be it known that I, F. C. FULGHUM, of Arba, in the county of Randolph, State of Indiana, have invented certain new and useful Improvements in Cane-Juice Evaporators, of which the following is a full, clear, and exact description, reference being had to the accompanying drawings and letters of reference marked thereon, forming part of the specification of my invention.

My improvements relate to a class of evaporators made of sheet metal, in which the juice is boiled in a thin stratum over an intense fire for the purpose of expelling the excess of water with rapidity, thereby avoiding prolonged exposure of the solution to heat. The bottom plate of these pans is usually made flat, and when exposed to heat unequal expansion frequently causes the thin metal to bulge up in spots, reducing the depth of juice so much that the parts thus exposed are liable to become suddenly dry and burn. To obviate this difficulty, and for other purposes which will be explained, I make the bottom of the evaporator or the portion exposed to greatest heat with a slight inclination downward from each side to the center line, and this constitutes one part of my invention.

Another feature of my invention consists in the employment of side bars or ledges in combination with inclined shores or sides for the retention of a certain class of impurities, which otherwise flow down and mingle with the juice after being carried to the sides with the foam and frothy scum.

Another feature of my invention relates to a mode of elevating the front end of the evaporator for the purpose of causing the contents thereof to flow rapidly to the opposite end where it is discharged.

In the accompanying drawings, Figure 1 is a perspective view of my improved evaporator supported upon a furnace. Fig. 2 is a front elevation of the same.

Like letters of reference indicate like parts so far as represented in the two drawings.

A is the furnace, which may be constructed as herein represented—that is, supported on a frame or in the ordinary way with brick or stone walls resting upon the ground.

B is the evaporator in which my improvements are represented. To the after end of B a small division, B', capable of being used as a separate pan, is partitioned off from the main evaporator. This may or may not be used in combination with the other. The evaporator B is formed of a thin sheet-metal bottom, $a$, inclined sides $b$, and vertical ends $c$.

$d$ is an aperture for the discharge of sirup into coolers, or in case the auxiliary pan B' is used of semi-sirup into the latter.

$e\ e$ are bars or ledges extending the entire length of B, one on each side, along the edge where the inclined sides join the bottom plate. These are one or two inches high. As the juice boils and the foam with the scum overflowing these bars or ledges floats to the sides, the light or frothy impurities lodge there and may be raked off from time to time; but the heavier particles are to a great extent separated from the lighter matters and wash down the sides, and if not obstructed, return into the body of the juice forming usually a sedimentary deposit upon the bottom of the pan. By the use of the ledges $e$ these impurities are arrested and prevented from returning to the pan, and at convenient intervals may be collected to one end and removed. The space between the bars or ledges $e$ and the inclined shores remain full of juice in a quiescent state, which favors the deposition of the particles, and allows them to remain until removed by the operator at his convenience.

The bottom of the evaporator for a portion of its length has an inclination downward from each edge to the center, extending from the front to near the after end, the depression amounting to one or two inches, diminishing gradually to near the after end, where it terminates, and the remaining portion of the bottom is level or flat, as represented at $a'$. The depression is indicated in Fig. 1 by shade lines $a''$. By giving the pan-bottom this form the tendency of the metal to expand and bulge upward is obviated. In addition thereto, the juice being deeper in the center immediately over the fire than at the sides, the foam rises highest in the middle, and floats the impurities more effectually to the sides, thus producing a better defecation. The expansion of the metal by heat is accommodated downward without any material strain upon the adjacent parts, and without causing leakage at the seams or cracks in the metal.

$f$ is a short hand-lever pivoted to a standard, $g$, secured to the furnace-front and to the front end of pan B by a pin, $h$.

$j$ is a notched bar adapted to hold lever $f$, the arrangement being such that by depressing the outer or free end of lever $f$ the front end of pan B is elevated several inches, where it may be held by slipping the lever appropriately into one of the notches of $j$. The contents of the pan are thereby caused to flow rapidly to the opposite end of the pan, where they discharge through aperture $d$. Narrow strips of sheet metal $k$ extend down from the lower face of the pan, one on either side, and just inside of the furnace-walls, which prevents an opening from being formed through which smoke would escape when the front end of the pan is elevated.

I am aware that many devices and plans have been invented for collecting and retaining the impurities from cane-juice, or for the same purpose as that provided by the bars or ledges $e$ described herein; but so far as I am informed they provide for the return of the juice from side chambers, where the latter are used, either through strainers or apertures for the purpose. This is not in accordance with my plan as herein described, which is to retain a portion of juice in the side spaces in a quiescent state, the more effectually to secure the deposition and retention of heavy particles until removed, and I desire to restrict my claim to the construction in which this is provided.

I am also aware that various plans have been devised for tilting evaporators for the purpose herein specified. I do not therefore claim giving an inclination to the pan for the purpose of "regulating" the flow of juice from one end to the other, but confine myself to the particular device herein described for this purpose of accelerating the discharge of sirup from the pan.

Having now fully described my invention, what I claim as new, and desire to secure by Letters Patent of the United States, is the following, viz:

1. The bars or ledges $e$, in combination with the inclined slides or shores $b$, when constructed and arranged, substantially in the manner herein represented and for the purpose described.

2. Forming the bottom with a central depression, as represented by shade lines $a''$, extending through a greater portion of the length of the pan, in combination with a flat or level portion, $a'$, as herein shown and described.

3. In combination with pan B and furnace A, the construction and arrangement of lever $f$, fulcrum $g$, pin $k$, and strips $l$, as herein shown and for the purpose described.

F. C. FULGHUM.

Witnesses:
   HENRY HORN,
   JESSE THOMAS.